United States Patent [19]
Arvidsson et al.

[11] Patent Number: 5,466,368
[45] Date of Patent: * Nov. 14, 1995

[54] ANION EXCHANGER

[75] Inventors: Lars-Erik Arvidsson, Storvreta; Hans Berg, Uppsala; Björn Engström, Sundsvall; Gunnar Hagström, Uppsala, all of Sweden

[73] Assignee: Pharmacia LKB Biotechnology AB, Uppsala, Sweden

[*] Notice: The portion of the term of this patent subsequent to Sep. 15, 2009, has been disclaimed.

[21] Appl. No.: 317,982

[22] Filed: Oct. 4, 1994

Related U.S. Application Data

[63] Continuation of Ser. No. 202,008, filed as PCT/SE91/00877, Dec. 18, 1991, abandoned, which is a continuation of Ser. No. 859,723, Jun. 12, 1992, abandoned.

[30] Foreign Application Priority Data

Dec. 21, 1990 [SE] Sweden ................................. 9004129

[51] Int. Cl.$^6$ .................................................. B01D 15/08
[52] U.S. Cl. .................................. 210/198.2; 210/502.1; 210/635; 210/656
[58] Field of Search .................................. 521/23, 25, 31, 521/32, 33; 210/635, 638, 656, 660, 679, 198.2, 502.1; 536/1.11, 18.7, 53, 54, 55, 55.1

[56] References Cited

U.S. PATENT DOCUMENTS

| | | | |
|---|---|---|---|
| 3,644,082 | 2/1972 | Berni | 8/194 |
| 4,032,293 | 6/1977 | Perrier | 210/719 |
| 4,067,689 | 1/1978 | Perrier | 8/188 |
| 4,298,500 | 11/1981 | Abbott | 210/198.2 |
| 4,510,128 | 4/1985 | Khanna | 521/32 |
| 4,567,206 | 1/1986 | Matsui | 521/32 |
| 4,659,744 | 4/1987 | Matsui | 521/32 |
| 4,797,187 | 1/1989 | Davis | 521/32 |
| 4,900,420 | 2/1990 | Kurauchi | 521/32 |
| 4,973,607 | 11/1990 | Stahlbush | 521/32 |
| 4,980,067 | 12/1990 | Hou | 210/638 |
| 5,010,084 | 4/1991 | Merz | 536/55.1 |
| 5,109,074 | 4/1992 | Eiftler | 521/32 |
| 5,147,536 | 9/1992 | Engstrom | 210/198.2 |
| 5,147,627 | 9/1992 | Chang | 502/208 |

FOREIGN PATENT DOCUMENTS

| | | | |
|---|---|---|---|
| 0167488 | 8/1986 | European Pat. Off. | 210/198.2 |
| 0295495 | 12/1988 | European Pat. Off. | 210/198.2 |
| 0320472 | 6/1989 | European Pat. Off. | 210/198.2 |
| 89/04203 | 5/1989 | WIPO | 210/198.2 |
| 9100145 | 10/1991 | WIPO | 210/198.2 |

*Primary Examiner*—Ernest G. Therkorn
*Attorney, Agent, or Firm*—Lowe, Price, LeBlanc & Becker

[57] ABSTRACT

An ion exchanger for chromatographic separation has the structure

P—S—A, wherein P is an insoluble support, S is a spacer, and A is a functional ligand. According to the invention the functional ligand A comprises two positively charged atoms, each selected from nitrogen and sulphur, at a distance of two atoms from each other, with the proviso that A can not be 4-methyl-1,4-diazabicyclo[2.2.2]octan-1-yl, 1,4,4-trimethylpiperazinium-1-yl, 1,4-dimethyl-1,4-diazabicyclo[2.2.2]octan-2-yl or 1,1,4,4-pentamethyl-1,4-diazabutan-1-yl.

8 Claims, No Drawings

ANION EXCHANGER

This application is a continuation of application Ser. No. 08/202,008 filed as PCT/SE91/00877, Dec. 18, 1991, which is a continuation of application Ser. No. 07/859,723, filed Jun. 12, 1992, both now abandoned.

The present invention is concerned with the field of chromatographic separation and relates in particular to a novel type of anion exchangers containing two positive charges at a distance of two atoms from each other.

Ion exchange chromatography—a technique where a sample is made to pass through a matrix containing immobilized charged groups which will bind sample components of the opposite charge—is used inter alia for the separation of biomolecules such as for example proteins, peptides and nucleic acids. Although this is one of the oldest separation methods it continues to be one of the basic techniques for modern biochemical separation procedures. As far as anion exchangers are concerned, i.e. ion exchanger is containing positively charged groups, the substances employed as such exchangers are in the first place amines attached to a solid phase of some kind or other in order to thus form either the charged groups themselves or groups chargeable in some particular environment. Primary, secondary and tertiary amine functions are classed as weak anion exchanger groups whereas quaternary amine functions are classed as strong anion exchanger groups. However, the use of these terms "weak" and "strong" does not reflect any qualitative assessment of the function of the ion exchanger; rather, it refers to the fact that a "strong" ion exchanger is charged over a broader pH range. In some practical applications, a weak ion exchanger is to be preferred over a strong one, and vice versa. As examples of anion exchangers that have been available commercially, for many years, may be mentioned DEAE Sephadex® and QAE Sephadex® (Pharmacia LKB Biotechnology AB, Uppsala, Sweden) containing diethylaminoethyl and quaternary aminoethyl groups, respectively, as their functional groups. Ion exchangers containing amino groups are disclosed also in a great number of publications, see for instance WO 89/04203, EP-A-167 488 and EP-A-295 495.

In all forms of chromatographic separation techniques it is imperative that one should achieve the best possible separation/resolution of the sample components into either individual components or individual groups of components. Resolution is a function of i.a. the efficiency and selectivity of the column employed. These factors are determined in the first place by the properties of the separation matrix, in combination with the geometry of the column; so these factors constitute fixed parameters of the system. Other factors affecting resolution are for instance sample loading, flow rate, temperature, pH, gradients etc. which thus have to be optimized for any given column in each given separation situation. A trend during recent years has been that efforts should be made towards obtaining an increased efficiency and concomitantly an increased resolution by means of employing a column packing material of lesser particle size. On the other hand, it seems that very little work has been devoted to efforts aimed at improving the selectivity of the ion exchangers. One of the factors affecting selectivity is the structure of the charged group that has been attached to the matrix.

Another important property of ion exchangers is their ion exchange capacity; in case the mobile phase ions are small monovalent ions, this capacity is equal to the number of charges in the matrix. A small ion is capable of penetrating through the surface layer formed by the charged substituents and reaches for example also charges lying deeply in the interior of narrow pores. But when it comes to binding of biomolecules, the situation is different. What determines the amount of a protein that can be bound to an ion exchanger is not only the number of charges on the gel but also the manner in which the charges are exposed on the matrix surface, implying that the porosity of the matrix and the structure of the ion-exchanging group are of decisive importance. Of course, also the charge properties of the protein will have an influence on the degree of binding.

In WO 91/00145 (which application was not published or made publicly available prior to the filing date of the present application) it is disclosed that the selectivity and capacity of strong anion exchangers may be improved considerably by means of introducing functional groups with charges arranged pairwise, these charges being located in a special structure in which they are exposed in an optimum manner to the ambient medium due to minimisation of charge shielding. The functional groups specifically described in WO 91/00145 are 4-methyl-1,4-diazabicyclo[2.2.2]-octan-1-yl (1), 1,4,4-trimethylpiperazinium-1-yl (2), 1,4-dimethyl-1,4-diazabicyclo[2.2.2]octan-2-yl (3), and 1,1,4,4,4-pentamethyl-1,4-diazabutan-1-yl (4) having the respective structures:

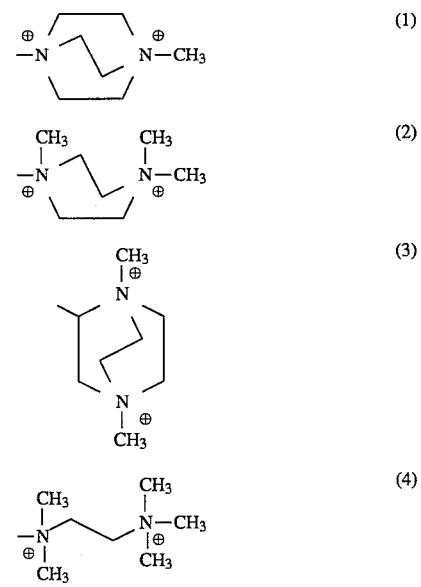

the characteristic feature being that the two charged nitrogen atoms are located at a distance of two atoms from each other. In structures (1), (2) and (3) the nitrogen atoms moreover form part of a cyclic structure. It is further stated in the specification that by choosing structures (1) and (3) on ion exchangers one will minimize steric hindrance thwarting interaction with sample molecules in a solution containing the ion exchanger.

In accordance with the present invention the above basic concept has been developed to provide a diversity of other functional groups for improving the selectivity and capacity of strong anion exchangers.

The present invention thus relates to an anion exchanger for chromatographic separation, said anion exchanger having the structure

P—S—A where P is an insoluble support, preferably in the form of discrete particles such as e.g. spherical particles of the type as known within this technical field, having a particle diameter of for example 1 to 500 μm.

S is a so-called spacer, id est a molecule chain that, preferably, does not interact with the sample molecules in any manner interfering with the separation procedure, but does promote exposure of the charged structure on the particle surface. If it is desired that for instance a certain amount of hydrophobic groupings are employed in the separation procedure, the spacer can of course be made hydrophobic in a known per se manner.

A is the charged ligand which in accordance with the present invention comprises two positively charged atoms, each selected from nitrogen and sulphur, at a distance of two atoms from each other, with the proviso that this functional ligand A can not be 4-methyl-1,4-diazabicyclo-[2,2,2]octan-1-yl, 1,4,4-trimethylpiperazinium-1-yl, 1,4-dimethyl-1,4-diazabicyclo[2.2.2]octan-2-yl or 1,1,4,4-pentamethyl-1,4-diazabutan-1-yl.

Preferably, the two atoms separating the positively charged atoms are carbon atoms.

The charged atoms may both be nitrogen atoms, or one may be sulphur and the other nitrogen, or both may be sulphur atoms. It is, however, preferred that both the charged atoms are nitrogen atoms, i.e. that the ligand comprises two quaternary amino groups.

The spacer S may be bound either to one of the charged atoms or to one of the two atoms separating the charged atoms.

A preferred group of ligands A within the above given definition for A are represented by the following formulae (IA) and (IB) (the use of two formulae reflecting the different positions of the free valence for the binding of the ligand to the spacer S):

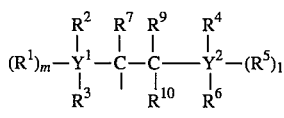

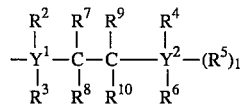

wherein $Y^1$ and $Y^2$ independently of each other are nitrogen or sulphur, $R^1, R^2, R^3, R^4, R^5$ and $R^6$ independently of each other are represented by the formula (II):

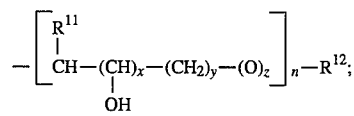

$R^7, R^8, R^9$ and $R^{10}$ independently of each other are hydrogen or $C_{1-4}$alkyl, $C_{1-4}$alkoxyalkyl or hydroxy-$C_{1-4}$alkyl;

$R^{11}$ is hydrogen, $C_{1-6}$alkyl, $C_{1-6}$alkoxyalkyl or hydroxy $C_{1-6}$alkyl;

$R^{12}$ is hydrogen, hydroxy, or $C_{1-4}$alkyl;

l is 0 or 1;

m is 0 or 1;

n is 1 to 5, x is 0 or 1;

y is 0 or 1;

z is 0 or 1;

with the provisos that:

l is 0 when $Y^2$ is sulphur;

m is 0 when $Y^1$ is sulphur;

z is 0 when $R^{12}$ is hydroxy;

$R^2$ together with $R^4$ and/or $R^3$ together with $R^6$ may form an ethylene group in which one or both carbon atoms may be mono- or disubstituted by $C_{1-4}$alkyl, $C_{1-4}$alkoxy, $C_{1-4}$alkoxyalkyl or hydroxy-$C_{1-4}$alkyl.

The tea alkyl as used herein (separately or in combinations) is meant to comprise both straight, and branched groups.

In one subgroup of ligands of formulae IA or IB, each substituent $R^1$ to $R^6$ independently has $R^{12}$ coupled to a group selected from:

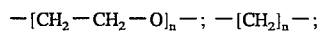

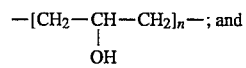

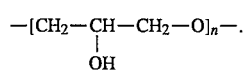

n is preferably 1 to 3, particularly 1 or 2, and more preferably 1.

A preferred group of ligands A consists of those wherein $R^1$ to $R^6$ (independently of each other) are alkyl, alkoxyalkyl or hydroxyalkyl having one to three carbon atoms (such as e.g. ethyl, methoxyethyl or hydroxyethyl, respectively).

In another preferred subgroup of ligands of formulae IA or IB at least one of the substituent pairs $R^2, R^4$ and $R^3, R^6$ forms an ethylene group which may optionally be substituted preferably by alkyl, alkoxy or hydroxyalkyl of one or two carbon atoms.

$R^7$ to $R^{10}$ are preferably (independently of each other) hydrogen or alkyl of one or two carbon atoms, and more preferably hydrogen.

$R^{11}$ is preferably alkyl having ho more than five carbon atoms, more preferably no more than three carbon atoms.

$R^{12}$ is preferably hydrogen, hydroxy or methyl.

As regards choosing the supportive matrix for binding of the functional group, this is an item which does not form part of the invention; a person skilled in the art can apply the inventive concept to the large number of supportive matrices that have been described for use in chromatographic separation procedures, and from among these he may choose one having desirable properties in respect of the other separation parameters. Examples of such matrices are inter alia gels of polysaccharides as for instance dextran, starch, cellulose and agarose, optionally after crosslinking for the purpose of increasing the rigidity of the material and thus improving its compressive and flow properties. Other examples are supportive matrices based on polystyrene-divinylbenzene, silica and acrylates.

Synthesis of ion exchangers according to the invention is carried out either by introducing reactive groups into the matrix chosen, said groups being reacted with either the ion exchanging group or a derivative thereof, or by causing a reactive derivative of the ion exchanging group to directly react with the matrix.

Coupling is performed with the aid of a so-called spacer, to be bound at one of its ends to the matrix and at the other end to the reagent that will produce one of the aforesaid ligand structures A. Such coupling of the spacer to the gel on one hand, and to the reagent on the other hand, is carried out by means of any of the numerous methods developed for couplings in this type of technological contexts, especially in the fields of affinity chromatography; examples of such methods are CNBr, epoxide, cyanate, hydrazide and sulfonyl coupling, to mention just a few out of a large number. The use of spacers or exposing functional groups on a matrix is likewise a very well-known method within this field of technology and does not form a part of the invention.

The invention is illustrated by way of the following non-limitative examples dealing with both the synthesis of ion exchangers and the use of these ion exchangers in chromatograpich separation procedures.

WORKING EXAMPLES

I. SYNTHESIS OF ION EXCHANGER ON POLYSTYRENE/DIVINYLBENZENE MATRIX.

Example 1

A) Allylation

Hydroxylated polystyrene/divinylbenzene gel (100 ml) was washed with 76 ml of 3M aqueous sodium hydroxide solution containing 0.38 g of sodium borohydride. The gel was added to 40 ml of the alkali solution, and 115.5 g of allyl glycidyl ether were added. The reaction mixture was then stirred overnight at 45° C., whereupon the gel was filtered and washed with ethanol and then with water.

B) Bromination and coupling of DABCO.
  Ion exchanger no. 1 (comparative)

$$A = -\overset{\oplus}{N}\diagup\diagdown N$$

The alilylated gel (50 ml) from step A) above was added to 30 ml of 0.014M sodium acetate solution. Bromine water was added, with stirring, until a lasting yellow color appeared. Excess bromine was removed with sodium formate. 12.1 g of DABCO (1,4-diazabicyclo[2.2.2]octane) were added, and the pH was adjusted to 10.5 by the addition of 45% aqueous sodium hydroxide solution. The reaction mixture was then stirred overnight at 45° C., whereupon the gel was filtered and washed with water, ethanol and finally water.

Example 2

Methylation of DABCO-coupled gel.
  Ion exchanger no. 2 (comparative; WO 91/00145)

$$A = -\overset{\oplus}{N}\diagup\diagdown \overset{\oplus}{N}-CH_3$$

7 ml of the DABCO-coupled gel from Example 1 were washed 3 times with ethanol and then 3 times with acetonitrile. The gel was then subjected to suction on a glass filter until it was dry. Thereafter the gel was added to 14 ml of acetonitrile. 0.43 g of methyl iodide was added at 30° C. The reaction mixture was stirred overnight at 30° C., whereupon the gel was filtered and washed with water, ethanol, 1M aqueous sodium chloride-solution and water.

Example 3

Ethylation of DABCO-coupled gel.
  Ion Exchanger no. 3

$$A = -\overset{\oplus}{N}\diagup\diagdown \overset{\oplus}{N}-CH_2CH_3$$

5 ml of the DABCO-coupled gel from Example 1 were alkylated with ethyl iodide (0.34 g) by using the reaction conditions described for the synthesis of ion exchanger no. 2 in Example 2.

Example 4

Propylenoxide alkylation of DABCO,coupled gel.
  Ion Exchanger no. 4

$$A = -\overset{\oplus}{N}\diagup\diagdown \overset{\oplus}{N}-CH_2-\underset{OH}{CH}-CH_3$$

7 ml of the DABCO-coupled gel from Example 1 were added to 14 ml of water, and the pH was adjusted to 5.7 with 2M hydrochloric acid solution. Then 7 g of propylene oxide were added, and the reaction mixture was stirred overnight at 45° C. The gel was filtered and washed with water, ethanol, water, 1M aqueous sodium chloride solution and water.

Example 5

Allylglycidyl ether alkylation of DABCO-coupled gel and hydroxylation.
  Ion exchanger no. 5

$$A = -\overset{\oplus}{N}\diagup\diagdown \overset{\oplus}{N}-CH_2-\underset{OH}{CH}-CH_2-O-CH_2-\underset{\underset{OH}{CH_2}}{\overset{OH}{CH}}$$

5 ml of the DABCO-coupled gel from Example 1 were added to 10 ml of water, and the pH was adjusted to 5.7 with 2M hydrochloric acid solution. Then 10 g of allylglycidyl ether were added and the reaction mixture was stirred overnight at 50° C. The gel was filtered and washed with ethanol, water, 1M aqueous sodium chloride solution and water. The allylglycidyl ether alkylated gel was hydroxylated by adding the gel to 6 ml of 0.014M aqueous sodium acetate solution. Bromine water was added, with stirring, until a stable yellow color was obtained. Excess bromine was removed with sodium formate. The pH was then adjusted to 12 by the addition of 4M sodium hydroxide. The reaction mixture was stirred overnight at 45° C. whereupon the gel was filtered and washed with water, ethanol and water.

Example 6

A) Bromination and coupling of thiomorpholine.
  10 ml of the allylated gel from Example 1 were added to 6 ml of 0.014M aqueous sodium acetate solution. Bromine water was added, with stirring, until a stable yellow color was obtained. Excess bromine was removed with sodium formate. The pH was then adjusted to 9 by the addition of 4M aqueous sodium hydroxide solution and 2.5 g of thiomorpholine were added. The reaction mixture was then stirred overnight at 45° C., whereupon the gel was filtered and washed with water, ethanol and water.

B) Methylation of the thiomorpholine-coupled gel.

Ion exchanger no. 6

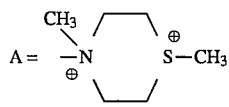

4 ml of the thiomorpholine-coupled gel from step A) above were washed 3 times with ethanol and 3 times with acetonitrile. It was then subjected to suction on a glass filter until the gel was dry. Thereafter the gel was added to 8 ml of acetonitrile and 1.5 g of methyl iodide were added at 30° C. The reaction mixture was stirred overnight at 30° C. The gel was then filtered and washed with water, ethanol, water, 1M aqueous sodium chloride solution and water.

Example 7

A) Azasulfenylation on allylated gel.

20 ml of the allylated gel from Example 1 were washed 3 times with nitromethane. The gel was then added to 60 ml of nitromethane and 2.1 g of dimethyl(methylthio)sulfonium fluoroborate were added at 2° C. The reaction mixture was stirred for 2 hours at 2° C., then overnight at room temperature, whereupon the gel was filtered and washed with nitromethane.

B) Methylation of azasulfenylated gel.

Ion exchanger no. 7

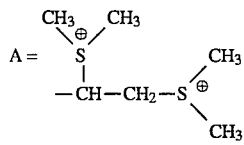

5 ml of the azasulfenylated gel from step A) above were washed 3 times with acetonitrile. The gel was then subjected to suction on a glass filter until it was dry. Thereafter the gel was added to 10 ml of acetonitrile, and 0.77 g of methyl iodide was added at 30° C. The reaction mixture was then stirred overnight at 30° C., whereupon the gel was filtered and washed with water, ethanol, water, 2M aqueous sodium hydroxide solution and water.

Example 8

Substitution with amine on azasulfenylated gel followed by methylation.

Ion exchanger no. 8

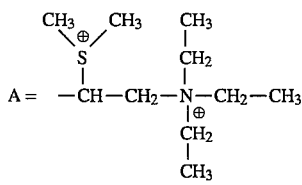

5 ml of the azasulfenylated gel from Example 8 were added to a solution containing 20 ml of nitromethane and 1.09 g of triethylamine. The reaction mixture was stirred for 4 days at room temperature. The gel was then filtered and alkylated with methyl iodide (0.77 g) by using the reaction conditions described for the synthesis of ion exchanger no. 7 in Example 7.

II. CHARACTERIZATION OF THE SELECTIVITY OF THE ION EXCHANGERS

With a test mixture consisting of transferrin 10 mg/ml ovalbumin 20 mg/ml

β-lactoglobulin 20 mg/ml the selectivity of the ion exchangers 1–6 produced above were characterized by means of determining the difference in elution volume divided by the void volume $V_0$, $(V_{e,m} - V_{e,n})/V_0$, m and n represent sequential numerals assigned to peaks of the chromatograms Column HR 5/5 (Pharmacia LKB Biotechnology AB); volume 1.0 ml Sample loading: 0.5 mg protein/ml gel Buffer A: 20 mM piperazine pH 6.0

Buffer B: Buffer A+0.6M NaCl

Flow rate: 150 cm/h

Gradient: 0–100% buffer B/20 column volumes (20 ml)

The test mixture listed above produces 4 peaks when eluted with a strong anion exchanger at pH 6.0. The mixture contains proteins of different sizes; and in reality the $V_0$ value is a different one for each of the different proteins, in as much as these would have been eluted at different volumes even if none of them were retarded by ion exchange interactions. This is a gel filtration phenomenon. However, all the proteins would have been eluted within one column volume. In the test series, $V_0$ has not been corrected in respect of this effect because in comparisons made on the same supportive matrix the $V_0$ error is the same for each protein on the different ion exchangers.

For comparison also the corresponding values obtained with the prior art ion exchanger Mono Q (Pharmacia LKB Biotechnology AB), these ion exchangers having the functional group (ion exchanger no. 0):

TABLE 1

| Results from separations performed on polystyrene/ divinylbenzene-based ion exchangers according to Example 1 | | | | | | |
|---|---|---|---|---|---|---|
| | Conc of ligand on gel | Capacity | $(V_{e,m} - V_{e,n})/V_0$ | | | |
| Ligand no. | mmol/ml gel | for Cl⁻ mmol/ml | m = 2 n = 1 | m = 3 n = 2 | m = 4 n = 3 | m = 4 n = 1 |
| 0 | 0.28 | 0.28 | 2.22 | 1.34 | 1.36 | 4.92 |
| 1 | 0.12 | 0.12 | 1.93 | 0.77 | 1.26 | 3.96 |
| 2 | 0.12 | 0.24 | 3.96 | 2.59 | 2.29 | 8.84 |
| 3 | 0.12 | 0.15 | 2.40 | 1.34 | 1.46 | 5.20 |
| 4 | 0.12 | 0.23 | 3.63 | 2.30 | 1.96 | 7.89 |
| 5 | 0.12 | 0.16 | 3.43 | 1.48 | 1.59 | 6.50 |
| 6 | 0.06 | 0.12 | 3.80 | 1.41 | 1.43 | 6.64 |

In conclusion, the ion exchangers no. 2–6 (nos. 3–6 being within the scope of the present invention) have a better selectivity than the conventional type of anion exchanger no. 0.

We claim:

1. An ion exchanger for chromatographic separation, having the structure

P—S—A wherein P is an insoluble support suitable for use in chromatographic procedures, S is a spacer, and A is a functional ligand, wherein said functional ligand A has the formula:

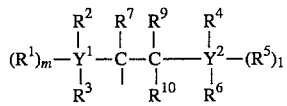
(IA)

or

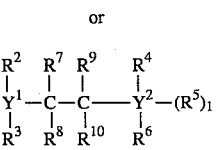
(IB)

wherein $Y^1$ and $Y^2$ independently of each other are positively charged nitrogen or sulphur, $R^1, R^2, R^3, R^4, R^5$ and $R^6$ independently of each other are represented by the formula (II):

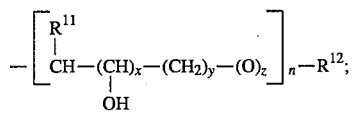
(II)

$R^7, R^8, R^9$ and $R^{10}$ independently of each other are hydrogen or $C_{1-4}$alkyl, $C_{1-4}$alkoxyalkyl or hydroxy-$C_{1-4}$alkyl;

$R^{11}$ is hydrogen, $C_{1-6}$alkyl, $C_{1-6}$alkoxyalkyl or hydroxy-$C_{1-6}$alkyl;

$R^{12}$ is hydrogen, hydroxy or $C_{1-4}$alkyl;

l is 0 or 1;

m is 0 or 1;

n is 1 to 5;

x is 0 or 1;

y is 0 or 1;

z is 0 or 1;

with the provisos that:

l is 0 when $Y^2$ is sulphur;

m is 0 when $Y^1$ is sulphur;

l and m are 1 when both $Y^1$ and $Y^2$ are positively charged nitrogens;

z is 0 when $R^{12}$ is hydroxy;

$R^2$ together with $R^4$ and/or $R^3$ together with $R^6$ may form an ethylene group in which one or both carbon atoms may be mono- or disubstituted by $C_{1-4}$alkyl, $C_{1-4}$alkoxy, $C_{1-4}$alkoxyalkyl or hydroxy-$C_{1-4}$alkyl; and A cannot be 4-methyl,1-4-diazabicyclo-(2.2.2)octan-1-yl, 1,4,4-trimethylpiperazinium-1-yl, 1,4-dimethyl-1,4-diazabicyclo-(2.2.2)octan-2-yl, or 1,1,4,4,4-pentamethyl-1,4-diazabutan-1-yl.

2. An ion exchanger according to claim 1 wherein said positively charged atoms are nitrogen atoms.

3. An ion exchanger according to claim 1 wherein one of said positively charged atoms is a nitrogen atom and the other is a sulphur atom.

4. An ion exchanger according to claim 1 wherein $R^1$ to $R^6$ comprise a group independently selected from:

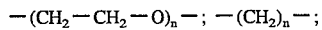

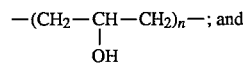

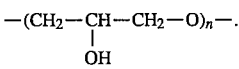

wherein n is as defined in claim 1.

5. An ion exchanger according to claim 4 wherein n is 1 or 2;

$R^7$ to $R^{10}$ independently of each other are hydrogen or $C_{1-2}$alkyl;

$R^{11}$ is $C_{1-3}$alkyl;

$R^{12}$ is hydrogen, hydroxy or methyl.

6. An ion exchanger according to claim 1 wherein $R^1$ to $R^6$ independently of each other are $C_{1-3}$alkyl, $C_{1-3}$alkoxyalkyl or hydroxy-$C_{1-3}$alkyl.

7. An ion exchanger according to claim 1 wherein at least one of the substituent pairs $R^2, R^4$ and $R^3, R^6$ forms an optionally substituted ethylene group.

8. An ion exchanger according to claim 1 wherein said support is a particulate cross-linked agarose or polystyrene-divinylbenzene matrix.

* * * * *